(12) United States Patent
Yamamoto et al.

(10) Patent No.: US 8,083,598 B2
(45) Date of Patent: Dec. 27, 2011

(54) BEARING DEVICE FOR WHEEL (75) Inventors: Kazunari Yamamoto, Iwata (JP); Kiyotake Shibata, Iwata (JP); Hiroshi Kawamura, Iwata (JP)

(73) Assignee: NTN Corporation, Osaka (JP)

( * ) Notice: Subject to any disclaimer, the term of this patent is extended or adjusted under 35 U.S.C. 154(b) by 289 days.

(21) Appl. No.: 12/308,999

(22) PCT Filed: Feb. 23, 2007

(86) PCT No.: PCT/JP2007/053407
§ 371 (c)(1),
(2), (4) Date: Mar. 16, 2009

(87) PCT Pub. No.: WO2008/007474
PCT Pub. Date: Jan. 17, 2008

(65) Prior Publication Data
US 2009/0203454 A1    Aug. 13, 2009

(30) Foreign Application Priority Data

Jul. 11, 2006  (JP) .................. 2006-190356
Jul. 11, 2006  (JP) .................. 2006-190367

(51) Int. Cl.
*F16C 19/18* (2006.01)
(52) U.S. Cl. .................. 464/178; 384/544
(58) Field of Classification Search .......... 464/178, 464/140, 182; 384/490, 544, 589; 301/35.627, 301/105.1, 35.63, 35.55, 35.58; 411/427; 188/17, 18 A, 26
See application file for complete search history.

(56) References Cited

U.S. PATENT DOCUMENTS

| 3,237,288 | A | * | 3/1966 | Hogan et al. | ............. 29/894.362 |
| 4,421,197 | A | * | 12/1983 | Chandioux | ................ 180/258 |
| 4,504,099 | A | * | 3/1985 | Miki et al. | ................. 384/543 |
| 4,529,254 | A | * | 7/1985 | Krude et al. | ................ 301/126 |
| 5,333,939 | A | * | 8/1994 | Krude et al. | ............... 301/124.1 |
| 5,658,082 | A | * | 8/1997 | Tsushima et al. | .......... 384/492 |
| 6,123,785 | A | * | 9/2000 | Iguchi et al. | .............. 148/330 |
| 6,196,639 | B1 | * | 3/2001 | Di Ponio et al. | .......... 301/105.1 |
| 6,602,358 | B1 | * | 8/2003 | Ochi et al. | ................. 148/328 |
| 6,702,682 | B2 | * | 3/2004 | Jacob | ......................... 464/145 |

(Continued)

FOREIGN PATENT DOCUMENTS
EP    1 647 418    4/2006
(Continued)

OTHER PUBLICATIONS

Patent Cooperation Treaty (PCT) International Preliminary Report on Patentability, issued Jan. 20, 2009.

(Continued)

*Primary Examiner* — Gregory Binda
*Assistant Examiner* — Matthieu Setliff
(74) *Attorney, Agent, or Firm* — Wenderoth, Lind & Ponack, LLP (57) ABSTRACT

A cylindrical pilot portion P to be fitted to an inner periphery of a wheel (80) is formed at an inner diameter part of a brake rotor (70). A shape of the hub wheel, in particular, the shape thereof on an outboard side is thereby simplified, and thus the hub wheel can be fabricated at low cost by cold forging or the like. An outer joint member (31) of an outboard side constant velocity universal joint (30) and a hub wheel (10) are connected with each other by way of a nut member (90).

10 Claims, 9 Drawing Sheets

U.S. PATENT DOCUMENTS

| | | | |
|---|---|---|---|
| 6,821,022 B2 * | 11/2004 | Brunetti et al. | 384/544 |
| 6,857,786 B2 * | 2/2005 | Csik | 384/589 |
| 6,857,835 B2 * | 2/2005 | Wang et al. | 411/204 |
| 6,991,380 B2 * | 1/2006 | Wang et al. | 384/544 |
| 7,195,399 B2 * | 3/2007 | Myers et al. | 384/544 |
| 2001/0004611 A1 | 6/2001 | Sahashi et al. | |
| 2002/0114552 A1 * | 8/2002 | Csik | 384/589 |
| 2006/0117903 A1 | 6/2006 | Kobayashi et al. | |
| 2006/0191752 A1 * | 8/2006 | Lee | 188/18 A |
| 2006/0192423 A1 * | 8/2006 | Song et al. | 301/105.1 |
| 2006/0244303 A1 * | 11/2006 | Savarese et al. | 301/105.1 |
| 2007/0135220 A1 | 6/2007 | Welschof | |
| 2008/0089629 A1 | 4/2008 | Seo et al. | |
| 2009/0074342 A1 * | 3/2009 | Tajima et al. | 384/544 |
| 2010/0119186 A1 * | 5/2010 | Fukumura et al. | 384/544 |

FOREIGN PATENT DOCUMENTS

| | | | |
|---|---|---|---|
| JP | 11-190346 | | 7/1999 |
| JP | 11-240306 | | 9/1999 |
| JP | 2001-171308 | | 6/2001 |
| JP | 2001347803 A | * | 12/2001 |
| JP | 2002-70881 | | 3/2002 |
| JP | 2003-72311 | | 3/2003 |
| JP | 2003-90350 | | 3/2003 |
| JP | 2003-246203 | | 9/2003 |
| JP | 2003294031 A | * | 10/2003 |
| JP | 2004-98885 | | 4/2004 |
| JP | 2004-144182 | | 5/2004 |
| JP | 2004-270855 | | 9/2004 |
| JP | 2005-96617 | | 4/2005 |
| JP | 2005-205532 | | 8/2005 |
| JP | 2005-256938 | | 9/2005 |
| JP | 2005-335585 | | 12/2005 |
| JP | 2006-7909 | | 1/2006 |
| JP | 2006-142983 | | 6/2006 |
| JP | 2006-151030 | | 6/2006 |
| JP | 2007326571 A | * | 12/2007 |
| WO | 98/21055 | | 5/1998 |
| WO | 2005/028217 | | 3/2005 |
| WO | 2006/057310 | | 6/2006 |

OTHER PUBLICATIONS

International Search Report issued Mar. 20, 2007 in the International (PCT) Application of which the present application is the U.S. National Stage.

* cited by examiner

BEARING DEVICE FOR WHEEL

BACKGROUND OF THE INVENTION

1. Technical Field

The present invention relates to a bearing device for supporting a wheel (regardless of a drive wheel or a driven wheel) of an automobile, and also to a drive shaft assembly used for the drive wheel of the automobile.

2. Description of the Related Art

Figure 9:
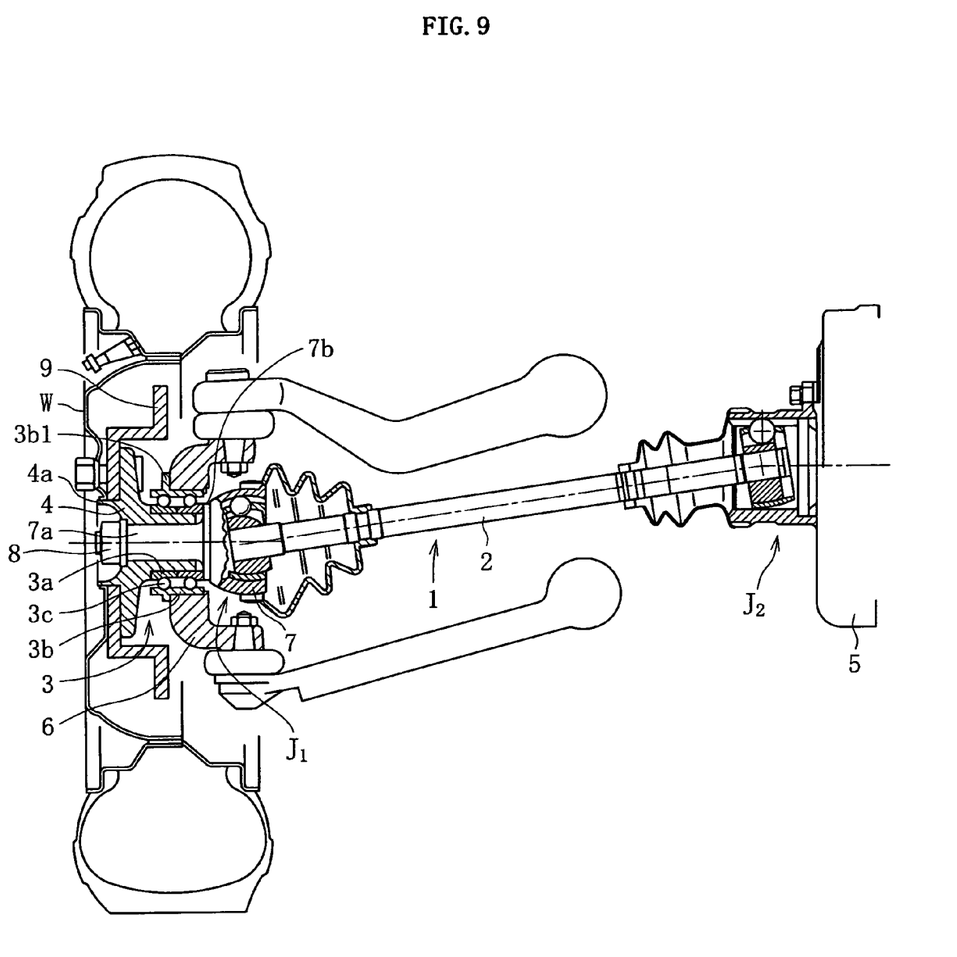
FIG. 9 is a cross-sectional view showing a schematic structure around a suspension device of a vehicle.

As shown in FIG. 9, a drive shaft 1 for transmitting power from an engine to a drive wheel has a configuration in which a fixed type constant velocity universal joint J1 on an outboard side (a vehicle body side part in a vehicle width direction) and a slidable type constant velocity universal joint J2 on an inboard side (vehicle body center in the vehicle width direction) are connected with an intermediate shaft 2. The constant velocity universal joint J1 on the outboard side is connected to a hub wheel 4 that is supported in a freely rotatable manner by a wheel bearing 3, and the constant velocity universal joint J2 on the inboard side is connected to a differential 5.

The wheel bearing 3 has a inner ring 3a fixed to an outer periphery of the hub wheel 4, a outer ring 3b fixed to a knuckle member 6 that extends from a suspension device on the vehicle body side, and a rolling element 3c arranged in double rows between the inner ring 3a and the outer ring 3b. Normally, the inner ring 3a is fixed to the outer periphery of the hub wheel 4 by being press fitted thereinto. The outer ring 3b is usually fixed to the knuckle member 6 by bolting a flange 3b1 of the outer ring 3b to the knuckle member 6.

The conventional drive shaft 1 is assembled to the vehicle by inserting a shaft end on the outboard side (a stem portion 7a of an outer joint member 7) of the drive shaft 1 into an inner periphery of the hub wheel 4 and screw-fitting a nut 8 to the shaft end that projects from the hub wheel 4 with the hub wheel 4 and the wheel bearing 3 being fixed to the knuckle member 6 in advance (see, e.g., Japanese Laid-Open Patent Publication No. 2004-270855). With tightening of the nut 8, the entire drive shaft 1 slides to the outboard side, and a shoulder portion 7b of the outer joint member 7 contacts an end face of the inner ring 3a. The outer joint member 7 and the hub wheel 4 are thereby positioned in an axial direction, and a predetermined pre-load is applied to the wheel bearing 3. An outer peripheral surface of the stem portion 7a of the outer joint member 7 and an inner peripheral surface of the hub wheel 4 are connected with each other by a spline (not shown), and a drive power of the engine transmitted to the outer joint member 7 is transmitted to the spline, and furthermore, to the wheel W via the hub wheel 4.

A pilot portion 4a is formed integrally with the shaft end on the outboard side of the hub wheel 4. Inner peripheral surfaces of a brake rotor 9 and a wheel W are each fitted into the outer peripheral surface of the pilot portion 4a.

SUMMARY OF THE INVENTION

1. Problems to be Solved by the Invention

As described above, conventionally, the hub wheel 4 has a complicated shape since the pilot portion 4a is formed on the hub wheel 4. Thus, the turning step is essential in manufacturing processes of the hub wheel. Rust proof coating for preventing wheel fixation also needs to be performed on the pilot portion. Such aspects are factors that lead to increase in cost of the hub wheel.

In the above conventional steps, there are required complicated tasks of making the knuckle member 6 assembled with the wheel bearing 3 and the hub wheel 4 stand by at a position pivoted from a neutral position in advance with a king pin center as a center, fixing the outboard side constant velocity universal joint J1 to the hub wheel 4 in this state, and fixing the inboard side constant velocity universal joint J2 to the differential 5 after returning the knuckle member 6 to the neutral position. Therefore, the assembly step of the drive shaft is complicated, which aspect is the factor leading to increase in cost. Furthermore, a large working space is required since the drive shaft pivots in accordance with pivoting of the knuckle member.

In view of the above problems, it is an object of the present invention to reduce cost of the hub wheel in the bearing device for wheel. It is another object to reduce cost of the drive shaft assembly including the hub wheel, the bearing unit, and two constant velocity universal joints.

Further another object of the present invention is to simplify the assembly step of the drive shaft assembly to the knuckle member.

2. Means for Solving the Problems

A bearing device for wheel according to the present invention includes an outer member having a plurality of outer races on an inner periphery; an inner member having a hub wheel integrally provided with a wheel attachment flange and at least one inner ring press fitted to an outer periphery of the hub wheel, and also having a plurality of inner races facing the outer races on an outer periphery; and a plurality of rows of rolling elements arranged between the opposing outer races and inner races, wherein a pilot portion, which is fitted to an inner periphery of the wheel, is arranged on a separate member other than the hub wheel.

The hub wheel can thus have a simplified shape, and the hub wheel can be formed by a low cost processing method such as simple cold forging. Also not required is the rust proof treatment for preventing fixation of the wheel to the hub wheel.

Axial positioning of the inner ring with respect to the hub wheel can be carried out by utilizing tightening force of the nut member. In this case, the seating surface of the hub wheel subjected to the tightening force from the nut member may be formed by cold forging or turning processing. The seating surface can be formed at low cost in the cold forging process, while an accurate seating surface can be obtained in the turning processing. A seating surface of high accuracy can be formed at low cost by performing the turning processing on a required site after cold forging the hub wheel, and then finishing the seating surface.

A pressed article may be used as the pilot portion. In this case, the pilot portion is used by being fitted to an opening of the hub wheel, for example. In addition, the pilot portion may be formed at the nut member.

A brake rotor may serve as a separate member on which the pilot portion is provided. Since the brake rotor is normally fabricated by casting, increase in cost is suppressed to a minimum even when the pilot portion is formed at the brake rotor.

When assembling the brake rotor to the hub wheel, the assembly work can be smoothly carried out by making the outer diameter part of the wheel attachment flange of the hub wheel serve as the guide surface for the brake rotor. In this case, the outer diameter part of the wheel attachment flange is desirably formed by turning processing so as to ensure precision of the outer diameter part.

A drive shaft assembly may be configured by an outboard side constant velocity universal joint, an intermediate shaft, an inboard side constant velocity universal joint connected to an inboard side of the outboard side constant velocity universal joint by way of the intermediate shaft, and the bearing device for the wheel described above.

Each of the maximum outer diameter dimensions of the outboard side and the inboard side constant velocity universal joints is made smaller than a minimum inner diameter dimension of the knuckle member, so that, even when the outer joint member of the outboard side constant velocity universal joint and the hub wheel are connected with each other, and the drive shaft, the hub wheel, and the bearing unit are assembled, the inboard side constant velocity universal joint, the intermediate shaft, and the outboard side constant velocity universal joint can be sequentially inserted to the inner periphery of the knuckle member to thereby assemble the assembly to the knuckle member. Such work can be performed by simply pushing the assembly in an axle direction, whereby the assembly work of the assembly is simplified. The term "constant velocity universal joint" includes accessories such as a boot, a boot band, and the like. Each of the maximum outer diameter dimensions of the outboard side and the inboard side constant velocity universal joints including these accessories is set smaller than the minimum inner diameter dimension of the knuckle member.

3. Effects of the Invention

According to the present invention, the cost of the hub wheel is reduced, and furthermore, costs of the entire bearing device for the wheel as well as the drive shaft assembly are reduced.

Assembly of respective elements such as the drive shaft, the bearing unit, and the hub wheel to the vehicle is simultaneously carried out, and the assembly step thereof can be simplified.

DETAILED DESCRIPTION OF THE INVENTION

Embodiments of a bearing device for a wheel according to the present invention will be described in detail below.

Figure 1:
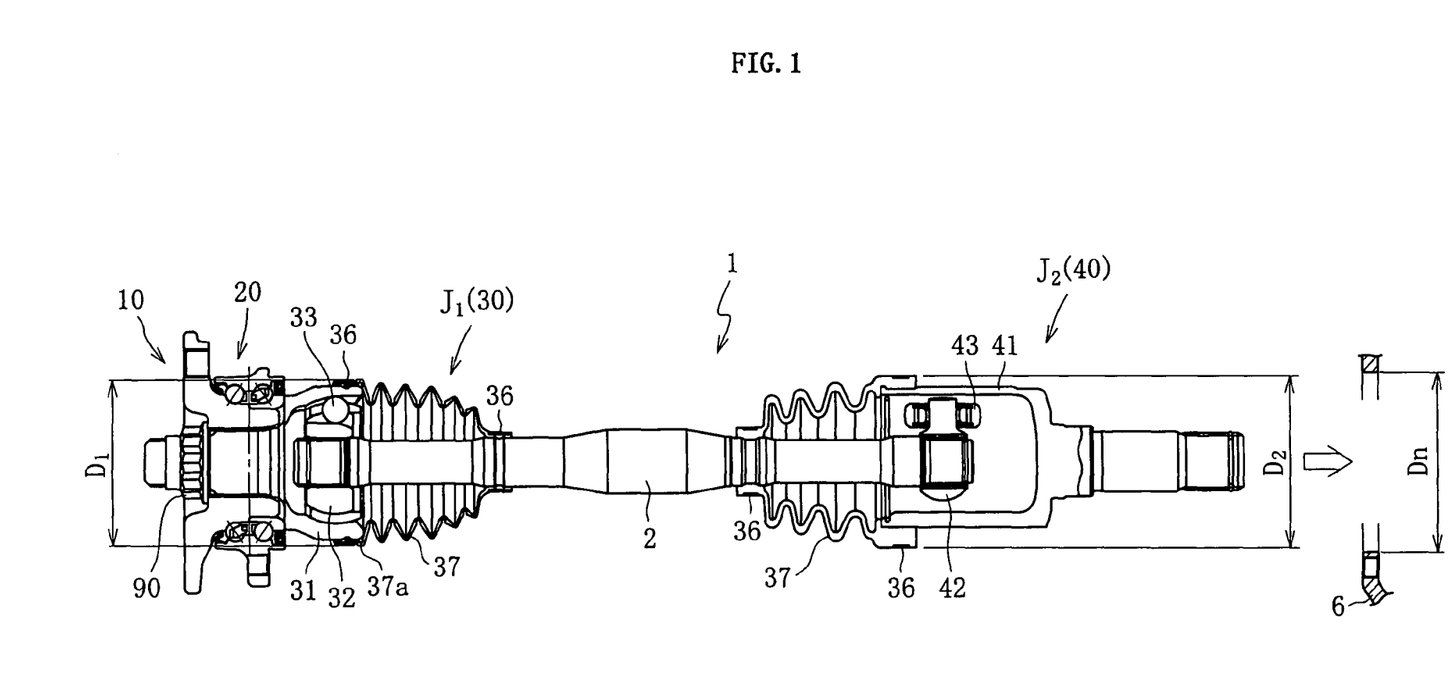
FIG. 1 is a cross-sectional view showing a drive shaft assembly.

FIG. 1 shows a drive shaft assembly. As shown in FIG. 1, the assembly includes a drive shaft 1, a hub wheel 10, and a bearing unit 20, as main components. The drive shaft 1 has a configuration in which an outboard side constant velocity universal joint 30 (fixed type constant velocity universal joint) and an inboard side constant velocity universal joint 40 (slidable type constant velocity universal joint) are connected with each other by way of an intermediate shaft 2.

Figure 2:
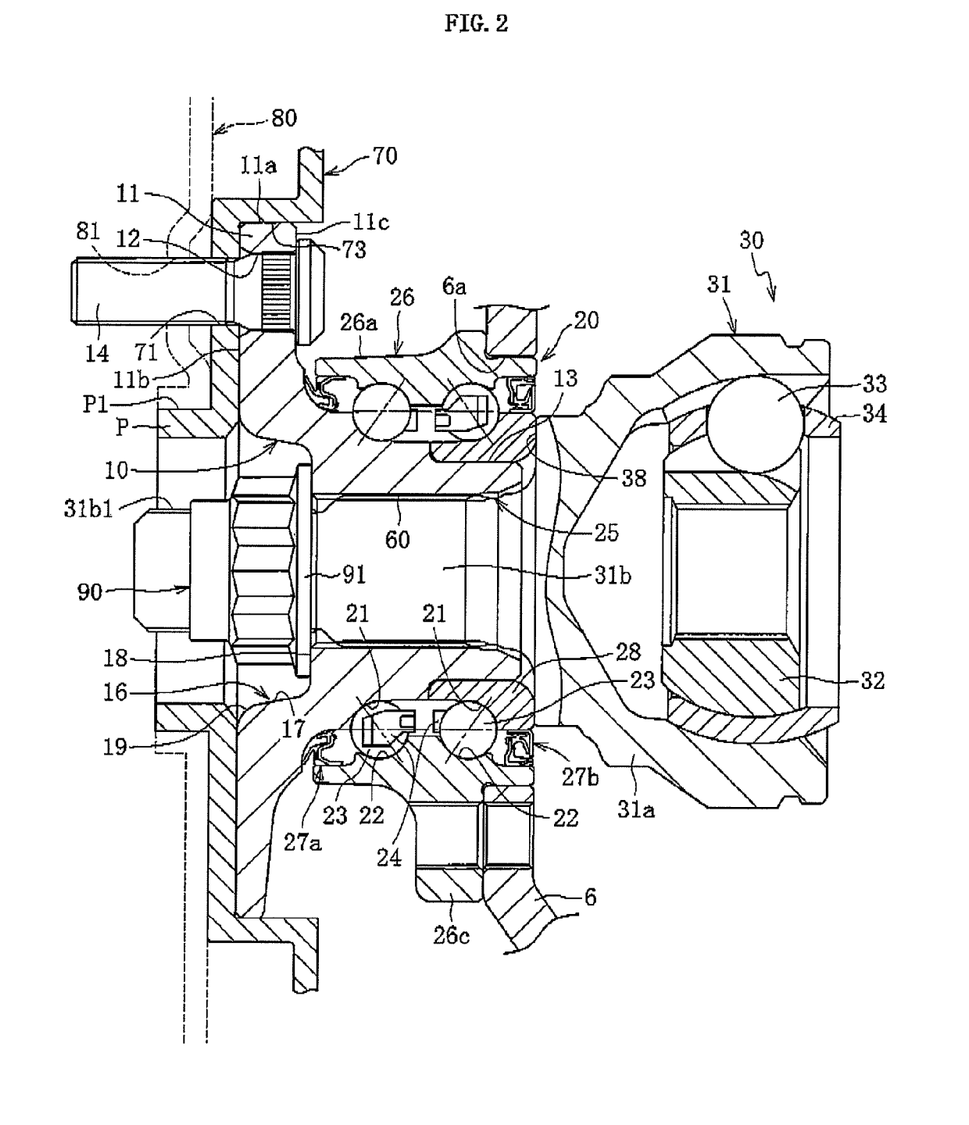
FIG. 2 is a cross-sectional view showing a bearing device for wheel according to a first embodiment.

FIG. 2 shows a bearing device for a wheel according to a first embodiment of the present invention. The bearing device is used for a drive wheel, and includes the hub wheel 10, the bearing unit 20, the outboard side constant velocity universal joint 30, and a nut member 90.

The hub wheel 10 has a hollow shape, and is provided with a wheel attachment flange 11 used for attaching a wheel 80 to an outer peripheral surface. A plurality of bolt holes 12 is formed in a circumferential direction of the wheel attachment flange 11, and a wheel bolt 14 for fixing a brake rotor 70 and the wheel 80 is implanted in the bolt hole 12. Unlike the conventional art, a pilot portion is not arranged on the outboard side of the hub wheel 10, and an outboard side end face 11b of the wheel attachment flange 11 is positioned closest to the outboard side of the hub wheel 10. A small diameter step part 13 formed on the outer peripheral surface on the inboard side of the hub wheel 10 is press fitted with an inner ring 28 at an appropriate fastening amount. A snap ring 29 (see FIG. 7) may be interposed between an inner peripheral surface of the inner ring 28 and an outer peripheral surface of the small diameter step part 13.

The bearing unit 20 has a double row angular ball bearing structure arrayed to face back to back, and has a double row of inner races 21 and outer races 22, rolling elements 23 arranged between the inner races 21 and the outer races 22 opposed to each other, and a holder 24 for holding the rolling element row on the outboard side (left side in the drawing) and the rolling element row on the inboard side (right side in the drawing) at equal intervals in the circumferential direction. In the illustrated example, a row of the inner races 21 on the outboard side is formed on the outer peripheral surface of the hub wheel 10, and a row of the inner races 21 on the inboard side is formed on the outer peripheral surface of the inner ring 28. In this case, the hub wheel 10 and the inner ring 28 configure an inner member 25 which has the double row inner races.

Although not illustrated, the double row inner races 21 may be formed on the inner ring which is press fitted to the outer peripheral surface of the hub wheel 10. In this case, the inner ring configures the inner member 25 having the double row inner races 21. Two inner rings may be press fitted to the outer peripheral surface of the hub wheel 10, and one row of inner races may be formed on each of the inner rings. In this case, the two inner rings configure the inner member 25 having the double row inner races.

The outer race 22 is formed on the inner peripheral surface of a ring-shaped integrated outer member 26. An outer peripheral surface 26a of the outer member 26 is formed with a vehicle body attachment flange 26c for fixing to a knuckle member 6 extending from a suspension device of the vehicle body. The outer member 26 is fixed to the knuckle member 6 by inserting the outer peripheral surface 26a of the outer member 26 from the outboard side to an inner peripheral surface 6a of the knuckle member 6 so as to be fitted by clearance fitting, and thereafter, bolting the vehicle body attachment flange 26c to the knuckle member 6 at a plurality of locations in the circumferential direction. The inner peripheral surfaces at both ends in the axial direction of the outer member 26 are press fitted and fixed with seals 27a, 27b.

The seal 27a on the outboard side has a configuration in which a core metal is covered with an elastic material such as rubber and a plurality of (e.g., three) seal lips is formed on an inner diameter side, and the seal 27a is fixed to the outer member 26 by press fitting the core metal to the inner peripheral surface of the outer member 26. The seal lips are in contact with both of the outer peripheral surface of the hub wheel 10 and the inboard side end face of the flange 11.

The seal 27b on the inboard side is referred to as a cassette seal, and has a configuration in which a plurality of (e.g., three) seal lips formed on the inner diameter side of the core metal is brought into contact with a slinger having a reverse L-shape in cross section. The seal 27b is fixed to an opening by press fitting the core metal to the inner peripheral surface of the outer member 26 and press fitting the slinger to the outer peripheral surface of the inner ring 28. The openings at both ends of the bearing unit 20 are sealed by the seals 27a, 27b, respectively, thereby preventing leakage of grease filled inside and entering of water and foreign substances from the outside.

In the bearing unit 20 of the illustrated example, a ball is exemplified as the rolling element 23, but a tapered roller may be used as the rolling element 23 in such a case where the vehicle weight is increased.

The outboard side constant velocity universal joint 30 is arranged at one end on the outboard side of the intermediate shaft 2 which configures the drive shaft 1. The constant velocity universal joint 30 is configured by an outer joint member 31 having a curved track groove formed on an inner peripheral surface; an inner joint member 32 having a curved track groove formed on an outer peripheral surface so as to face the track groove of the outer joint member 31; torque transmission balls 33 incorporated between the track groove of the outer joint member 31 and the track groove of the inner joint member 32; and a cage 34 interposed between the outer joint member 31 and the inner joint member 32 so as to hold the torque transmission balls 33 at equal intervals in the circumferential direction. The inner joint member 32 is connected to an outboard side end of the intermediate shaft 2 which is inserted to the inner periphery by way of a serration.

The outer joint member 31 is manufactured by cold forging or the like, and has a mouse portion 31a for accommodating the inner joint member 32, the cage 34, and the torque transmission balls 33, and a solid stem portion 31b integrally extending in the axial direction from the mouse portion 31a.

The stem portion 31b is inserted to the inner periphery of the hub wheel 10, and is connected in a torque transmissible manner with the hub wheel 10 by way of a spline 60. A male screw 31b1 is formed at a shaft end of the stem portion 31b. The nut member 90 is screw fitted to the male screw 31b1 and is tightened with a predetermined torque, whereby a shoulder surface 38 of the outer joint member 31 is brought into contact with the end face on the inboard side of the inner ring 28, and the end face on the outboard side of the inner ring 28 is brought into axial contact with the hub wheel 10. The interval of the double row inner races 21 is thereby held at a defined dimension, and a predetermined pre-load is applied to the bearing unit 20.

As shown in FIG. 1, the inboard side constant velocity universal joint 40 is configured by a tripod type constant velocity universal joint, or the like. The inboard side constant velocity universal joint 40 is arranged at one end on the inboard side of the intermediate shaft 2, and includes, as main components, an outer joint member 41 having a linear track groove formed on an inner peripheral surface, a roller 43 that rolls on the track groove of the outer joint member 41, and an inner joint member 42 connected to the intermediate shaft 2 so as to rotatably support the roller 43. A double offset type constant velocity universal joint may be used as the inboard side constant velocity universal joint 40.

The nut member 90 is accommodated in a nut housing unit 16 which is formed at the end on the outboard side of the hub wheel 10. A seat 91 of the nut member 90 is pressure welded to a seating surface 18 of the nut housing unit 16 due to tightening of the nut member 90. The nut housing is provided, at its circumferential surface with a tapered surface 17 having a smaller diameter at its inboard side portion. A transition between the tapered surface 17 and the outboard side end face 11b is smoothly continuous through an arc-shaped surface 19. As shown in FIG. 2, the seating surface is located further inboard relative to an inboard side end face 11c of the wheel attachment flange. In the embodiment shown in FIG. 2, the nut housing unit 16 inclusive of the seating surface 18 is molded by cold forging.

The brake rotor 70 is arranged to be in close contact with the outboard side end face of the wheel attachment flange 11. The brake rotor 70 is formed with holes 71 used for inserting wheel bolts 14 at a plurality of locations in the circumferential direction, and a pilot portion P is formed at the inner diameter end. An outer peripheral surface P1 of the pilot portion P has a cylindrical surface, where the inner peripheral surface of the brake rotor 70 and the inner peripheral surface of the wheel 80 are fitted to the outer peripheral surface P1. The distal end of the wheel bolt 14 implanted in the bolt hole 12 of the wheel attachment flange 11 passes through a hole 71 of the brake rotor 70 and a hole 81 of the wheel 80 to be projected to the outboard side. The hub wheel 10, the brake rotor 70, and the wheel 80 are integrally held by screw-fitting and tightening a wheel nut (not shown) to the distal end of the wheel bolt 14.

Therefore, the shape on the outboard side of the hub wheel 10 can be simplified in comparison to the conventional structure shown in FIG. 9 by forming the pilot portion P on the brake rotor 70. Thus, the entire hub wheel 10 inclusive of the seating surface 18 of the nut housing unit 16 can be molded by cold forging. Further, the hub wheel 10 is not arranged with the pilot portion, thereby rust proof treatment for prevention of wheel fixation to the hub wheel 10 is not required. Therefore, it is possible to reduce manufacturing cost of the hub wheel 10. Since the brake rotor 70 is usually manufactured by the casting method, increase in manufacturing cost thereof can be suppressed to a minimum even in a case where the shape of the brake rotor 70 is made more complex due to the arrangement of the pilot portion P.

As shown in FIG. 2, an outer diameter part 11a of the wheel attachment flange 11 is desirably fitted to a cylindrical surface 73 formed on the brake rotor 70. When assembling the brake rotor 70 to the hub wheel 10, the outer diameter part 11a of the wheel attachment flange 11 functions as a guide surface for guiding the brake rotor 70, and therefore, workability of assembling the brake rotor 70 can be improved.

As shown in FIG. 1, a maximum outer diameter dimension D1 of the outboard side constant velocity universal joint 30 and a maximum outer diameter dimension D2 of the inboard side constant velocity universal joint 40 are set smaller than a minimum inner diameter dimension Dn of the knuckle member 6 (D1<Dn, D2<Dn) in the drive shaft assembly. Assembly to the vehicle can be carried out with the drive shaft 1, the hub wheel 10, and the bearing unit 20 having been assembled in advance (drive shaft assembly). In other words, the inboard side constant velocity universal joint 40, the intermediate shaft 2, and the outboard side constant velocity universal joint 30 are sequentially inserted to the inner periphery of the knuckle member 6 in this order with the outer joint member 31 of the outboard side constant velocity universal joint 30 and the hub wheel 10 having been connected with each other using the nut member 90. The vehicle body attachment flange 26c of the outer member 26 is then bolted to the knuckle member 6, so that assembly to the vehicle of the drive shaft, the hub wheel, and the bearing unit is completed at the same time. The number of working steps at an assembly working site is thereby reduced, and workability is enhanced. Furthermore, workability of assembly is also satisfactory since a push-in direction of the drive shaft assembly is constant. In this case, the working space can be minimized since the knuckle member 6 does not need to be pivoted as in the conventional step.

The "minimum inner diameter dimension Dn" of the knuckle member 6 refers to the inner diameter dimension of the portion closest to the inner diameter side of the knuckle member 6. In a case where the inner peripheral surface 6a of the knuckle member 6 is a smooth cylindrical surface as in the embodiment shown in FIG. 2, the inner diameter dimension of the inner peripheral surface 6a is equal to the "minimum inner diameter dimension".

The "maximum outer diameter dimensions D1, D2" of the constant velocity universal joints 30, 40 each refer to the outer diameter dimension of the portion closest to the outer diameter side in the constant velocity universal joint including accessories such as the boot 37 and the boot band 36 (see FIG. 1). For instance, in the outboard side constant velocity universal joint 30 shown in FIG. 1, an outer diameter dimension of a boot maximum diameter portion 37a is equal to the maximum outer diameter dimension D1 of the outboard side constant velocity universal joint 30.

After assembling the drive shaft assembly to the vehicle body according to the above procedures, the brake rotor 70 and the wheel 80 are assembled to the hub wheel 10 as shown in FIG. 2.

Figure 3:
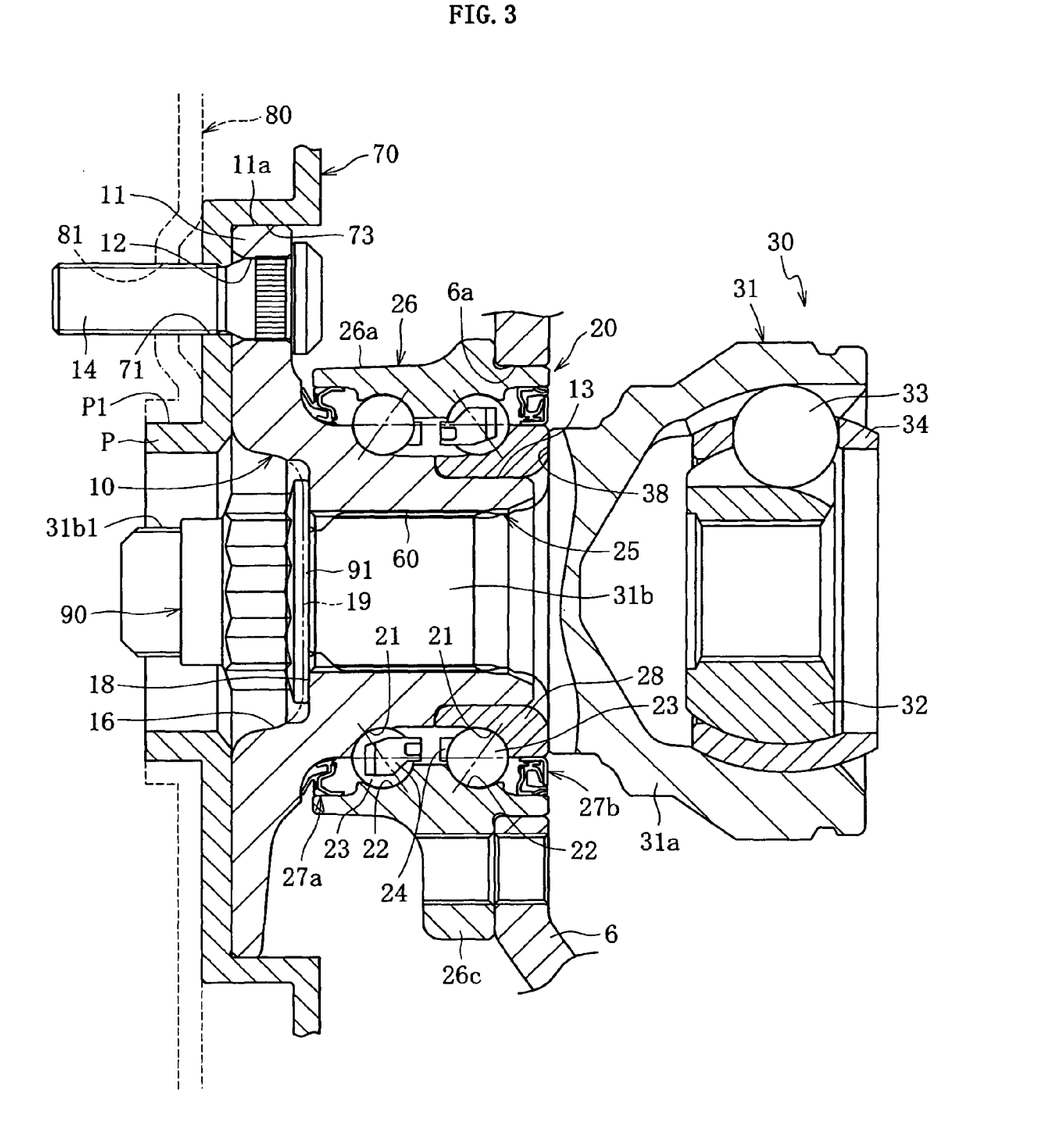
FIG. 3 is a cross-sectional view showing a bearing device for wheel according to a second embodiment.

FIG. 3 shows a bearing device for a wheel according to a second embodiment, which differs from the first embodiment shown in FIG. 2 in that the seating surface 18 of the nut housing unit 16 is finished by turning processing. Specifically, after forming the nut housing unit 16 by cold forging (a forged surface is denoted with reference number 19), the surface is subjected to turning processing so as to finish the seating surface 18 at a predetermined surface accuracy. Processing accuracy of the seating surface 18 improves by finishing the seating surface 18 by turning processing, and thus the pre-load management of the bearing unit 20 can be carried out at higher accuracy. The seating surface 16 of high accuracy can be obtained at a lower cost by finishing the seating surface 16 by turning processing after molding the nut housing unit 16 by cold forging, in comparison to a case of forming the entire nut housing unit 16 by turning processing.

Figure 4:
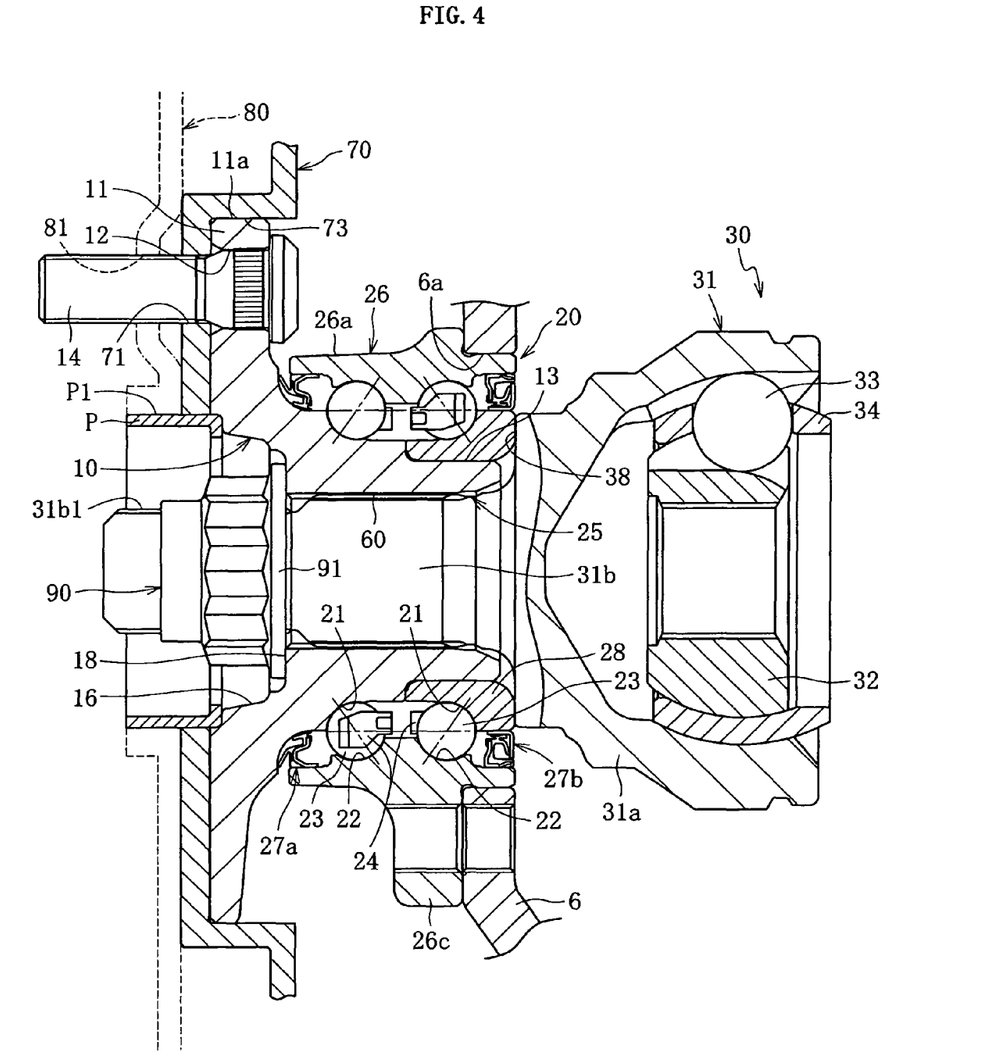
FIG. 4 is a cross-sectional view showing a bearing device for wheel according to a third embodiment.
Figure 5:
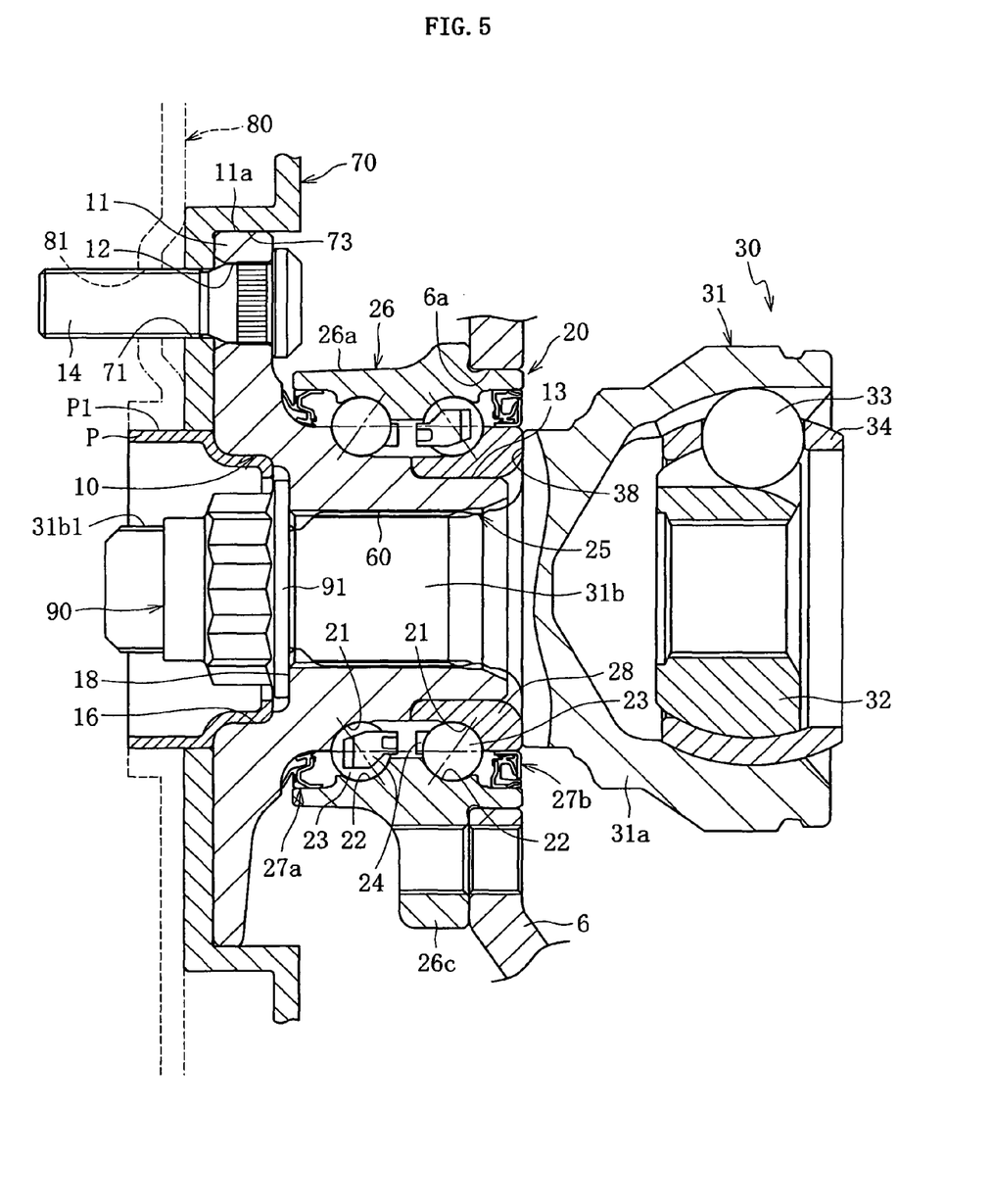
FIG. 5 is a cross-sectional view showing a bearing device for wheel according to a fourth embodiment.

The pilot portion P may be formed on a separate member other than the brake rotor 70. In both a third embodiment shown in FIG. 4 and a fourth embodiment shown in FIG. 5, the pilot portion P is molded as a member separate from the hub wheel 10 by pressing a metal plate, where FIG. 4 shows the pilot portion P formed into a reverse L-shape in cross section, and FIG. 5 shows a pilot portion P formed into a cup shape. In any of these configurations, the pilot portion P is fixed to the opening on the outboard side of the hub wheel 10 by means of press fitting or the like, and has a cylindrical surface P1 projecting to the outboard side beyond the outboard side end face of the wheel attachment flange 11. The inner peripheral surface of the brake rotor 70 and the inner peripheral surface of the wheel 80 are fitted to the respective cylindrical surfaces P1.

Figure 6:
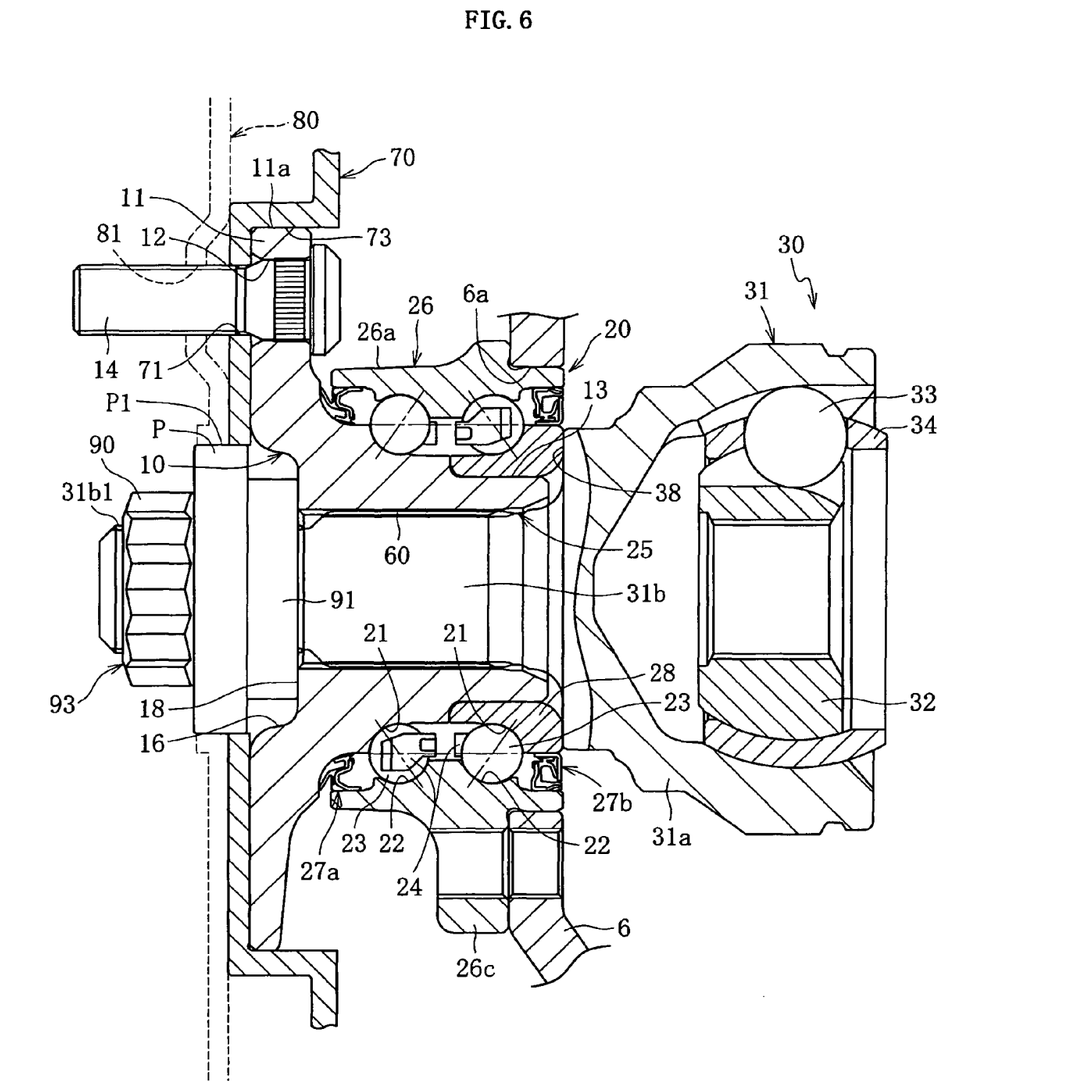
FIG. 6 is a cross-sectional view showing a bearing device for wheel according to a fifth embodiment.

FIG. 6 shows a bearing device for a wheel according to a fifth embodiment. In this embodiment, the pilot portion P is formed on the nut member 90. The nut member 90 in this embodiment has a configuration in which a flange-shaped pilot portion P is integrally formed. The seat 91 of the nut member 90 is formed thicker than the seat 91 of the nut member 90 shown in FIG. 2, whereby the pilot portion P is arranged on the outboard side with respect to the outboard side end face of the wheel attachment flange 11. The inner peripheral surface of the brake rotor 70 and the inner peripheral surface of the wheel 80 are fitted to the cylindrical outer peripheral surface P1 of the pilot portion P.

Figure 7:
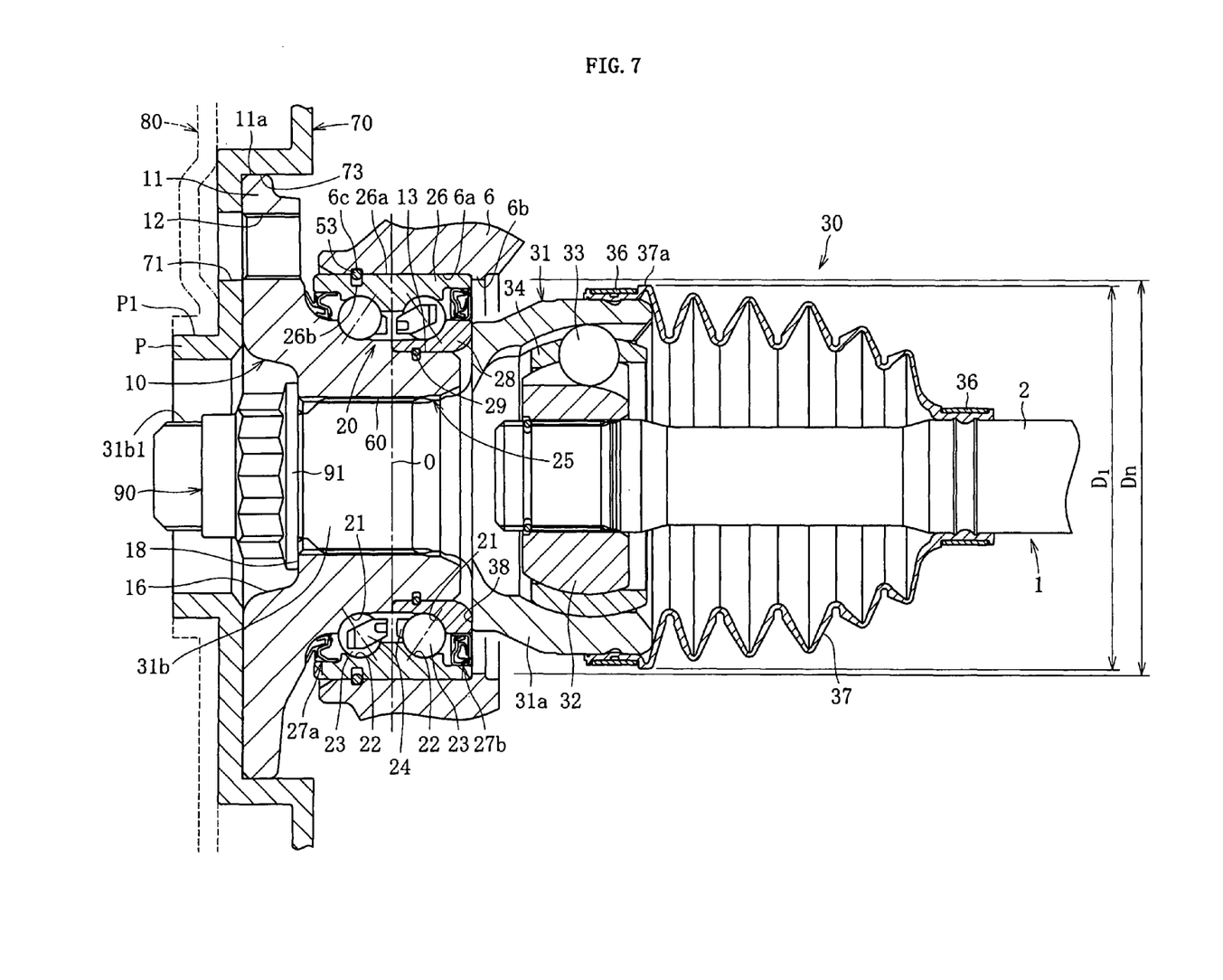
FIG. 7 is a cross-sectional view showing a bearing device for wheel according to a sixth embodiment.
Figure 8:
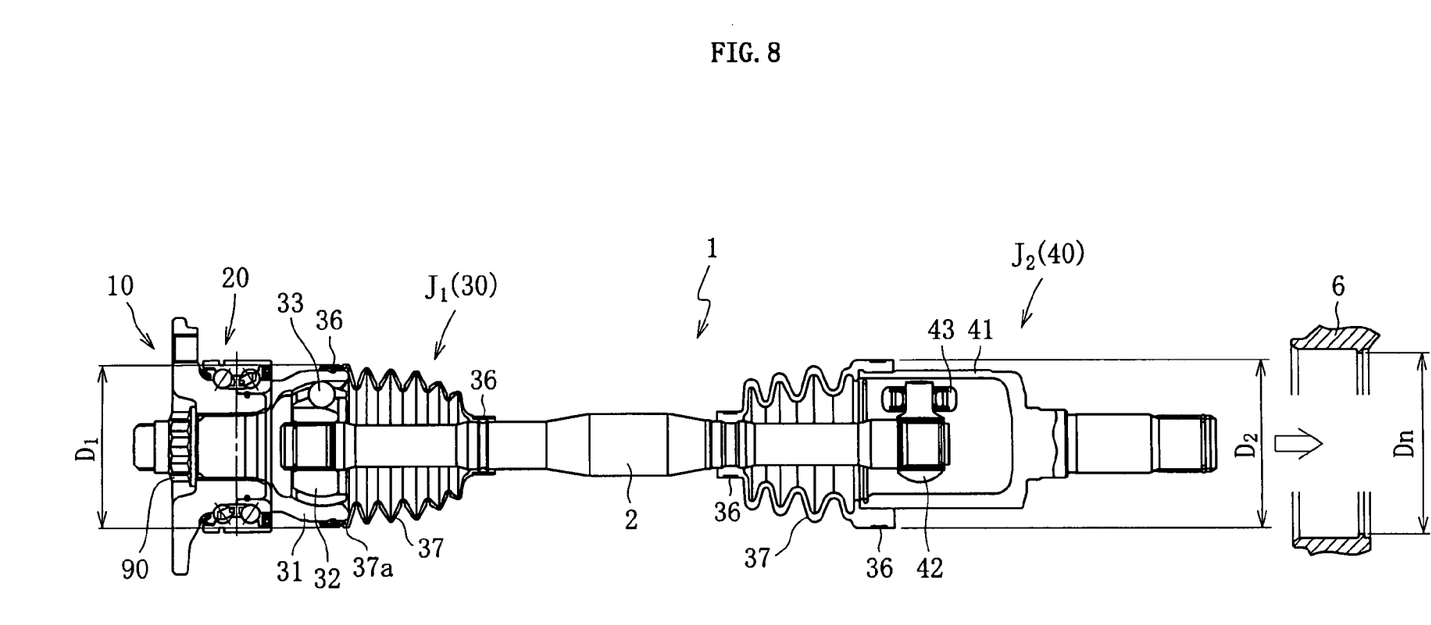
FIG. 8 is a cross-sectional view showing a drive shaft assembly.

FIG. 8 shows another configuration of the drive shaft assembly, and the bearing device for a wheel (sixth embodiment) including the above drive shaft assembly is shown in FIG. 7. In the above first to the fifth embodiments, the vehicle body attachment flange 26c is provided on the outer member 26 and the flange 26c is bolted to the knuckle member 6. In the sixth embodiment, the outer peripheral surface 26a of the outer member 26 is fitted in and incorporated in the inner peripheral surface 6a of the knuckle member 6 on the vehicle body side.

The fit-in incorporation referred to in this case means fitting the outer member 26 to the knuckle member 6 to complete incorporation of these members. Such incorporation can be carried out, for example, by press fitting, from the outboard side, the cylindrical outer peripheral surface 26a of the outer member 26 to the cylindrical inner peripheral surface 6a of the knuckle member 6, as shown in FIG. 7.

A projection 6b that axially engages with the end face of the outer member 26 is arranged at the inboard side end of the inner peripheral surface 6a of the knuckle member 6, as necessary. As shown in FIG. 7, when the projection 6b is arranged, the inboard side end face of the outer member 26 press fitted from the outboard side is brought in contact with the projection 6b, and at the same time, a snap ring groove 6c formed on the inner peripheral surface 6a of the knuckle member 6 and a snap ring groove 26b formed on the outer peripheral surface 26a of the outer member 26 face each other. Further, the diameter of the snap ring 53 accommodated in the snap ring groove 26b of the outer member 26 elastically expands, thereby engaging with both the knuckle member 6 and the outer member 26 in the axial direction. When the projection 6b is arranged on the inner peripheral surface of the knuckle member 6, the inner diameter dimension of the projection 6b is equal to the "minimum inner diameter dimension Dn" of the knuckle member. In a case where sufficient fixation force is obtained simply by press fitting the outer member 26, the projection 6b of the knuckle member 6 may not be provided, or the snap ring 53 may not be provided.

In a case where the snap ring 53 is arranged on the outboard side with respect to an axial center line O of the rolling element 23 on the inboard side and the rolling element 23 on the outboard side, as shown in FIG. 7, it is possible to reduce a sliding distance of the snap ring 53 with respect to the inner peripheral surface 6a of the knuckle member when press fitting the outer member 26, thereby avoiding damage to the inner peripheral surface 6a of the knuckle member due to dragging of the snap ring 53.

Therefore, in comparison to a case of bolting the flanged outer member 26 at a plurality of locations of the knuckle member 6 (see FIG. 1 to FIG. 6) by forming a press-fit surface on the outer peripheral surface 26a of the outer member 26 and press fitting and fixing the outer member 26 to the inner periphery of the knuckle member 6, bolt fastening work can be unnecessary, and thus, the number of parts and the number of working steps can be accordingly reduced with reduced cost.

When the outer member 26 is press fitted to the knuckle member 6, diameter reducing force in a radial direction is applied to the press fitted outer member 26, and a bearing clearance is reduced by such diameter reducing force. Therefore, an appropriate amount of negative clearance (e.g., 0 to 100 μm, preferably 0 to 30 μm) can be obtained after the press fitting in a case of appropriately setting the press fitting amount in view of the preliminary pre-load amount due to tightening of the nut member 90. In a case of a positive clearance greater than zero, bearing rigidity is insufficient and durability is decreased, whereas in a case where the negative clearance amount is greater than 100 μm, the pre-load is increased excessively and may cause abnormal heat generation. The pre-load amount applied to the bearing unit 20 can be stabilized by evenly setting the press fitting amount on the outer diameter side of each of the outer races 22 when press fitting the outer member 26.

In each of the embodiments described above, there is exemplified the bearing device for a drive wheel including the outboard side constant velocity universal joint 30. The present invention can also be applied to a bearing device for a driven wheel not including a constant velocity universal joint.

DESCRIPTION OF REFERENCE NUMERALS 1 drive shaft
2 intermediate shaft
6 knuckle member
10 hub wheel
11 wheel attachment flange
11a outer diameter part
11b outboard side end face
11c inboard side end face
14 wheel bolt
16 nut housing unit
17 tapered surface
18 seating surface
19 arc-shaped surface
20 bearing unit
21 inner race
22 outer race
23 rolling element
24 holder
25 inner member
26 outer member
26a outer peripheral surface
27a seal
27b seal
28 inner ring
30 outboard side constant velocity universal joint
31 outer joint member
31a mouse portion
31b stem portion
32 inner joint member
33 torque transmission ball
34 cage
36 boot band
37 boot
38 shoulder surface
40 inboard side constant velocity universal joint
70 brake rotor
80 wheel
90 nut member
91 seat
P pilot portion
Dn minimum inner diameter dimension of knuckle member
D1 maximum outer diameter dimension of outboard side constant velocity universal joint D2 maximum outer diameter dimension of inboard side constant velocity universal joint

The invention claimed is:

1. A bearing device for a wheel comprising:
an outer member having a plurality of outer races on an inner periphery;
an inner member including a hub wheel integrally having a wheel attachment flange, at least one inner ring press fitted to an outer periphery of the hub wheel, and a plurality of inner races facing the outer races on an outer periphery; and a plurality of rows of rolling elements arranged between the outer races and the inner races facing each other; and
a pilot portion for being fitted, to an inner periphery of a wheel, the pilot portion being arranged on a separate member other than the hub wheel, wherein:
an outboard side end face of the wheel attachment flange is a flat surface at a position closest to the outboard side in the hub wheel;
a nut housing portion is formed in the outboard side end face, the nut housing portion defining an opening and a seating surface surrounding the opening for contacting a nut member;
the seating surface is located further inboard relative to an inboard side end face of the wheel attachment flange; and
the nut housing portion includes a tapered circumferential surface having a smaller diameter at an inboard-side portion thereof, and the tapered circumferential surface is made smoothly continuous with the outboard side end face via an arc-shaped surface.

2. The bearing device for wheel according to claim 1, wherein the seating surface is formed on the hub wheel by cold forging.

3. The bearing device for wheel according to claim 1, wherein the seating surface is formed on the hub wheel by turning processing.

4. The bearing device for wheel according to claim 1, wherein the pilot portion is formed by press working.

5. The bearing device for wheel according to claim 1, further comprising a nut member seated on the seating surface of the nut housing portion, wherein the pilot portion is formed on the nut member.

6. The bearing device for wheel according to claim 1, wherein the pilot portion is formed on a brake rotor.

7. The bearing device for wheel according to claim 6, wherein an outer diameter part of the wheel attachment flange of the hub wheel functions as a guide surface for the brake rotor.

8. The bearing device for wheel according to claim 7, wherein the outer diameter part of the wheel attachment flange of the hub wheel is formed by turning processing.

9. A drive shaft assembly comprising: an outboard side constant velocity universal joint; an intermediate shaft; an inboard side constant velocity universal joint connected to an inboard side of the outboard side constant velocity universal joint by way of the intermediate shaft; and the bearing device for wheel according to claim 1.

10. The drive shaft assembly according to claim 9, wherein each maximum outer diameter dimension of the constant velocity universal joints on the outboard side and the inboard side is smaller than a minimum inner diameter dimension of a knuckle member.

* * * * *